US008587598B2

(12) United States Patent
Lin

(10) Patent No.: US 8,587,598 B2
(45) Date of Patent: Nov. 19, 2013

(54) MEMORY ADDRESS MAPPING METHOD FOR CONTROLLING STORAGE OF IMAGES IN MEMORY DEVICE AND MEMORY ADDRESS MAPPING CIRCUIT THEREOF

(75) Inventor: Yen-Sheng Lin, Yilan County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 820 days.

(21) Appl. No.: 12/772,964

(22) Filed: May 3, 2010

(65) Prior Publication Data

US 2011/0102447 A1 May 5, 2011

Related U.S. Application Data

(60) Provisional application No. 61/255,898, filed on Oct. 29, 2009.

(51) Int. Cl.
*G09G 5/399* (2006.01)
*G06F 12/02* (2006.01)

(52) U.S. Cl.
USPC .......................................... 345/540; 345/547

(58) Field of Classification Search
USPC .................... 345/530, 540, 544, 547
See application file for complete search history.

(56) References Cited

U.S. PATENT DOCUMENTS

| 5,581,310 A * | 12/1996 | Vinekar et al. ................. 348/718 |
| 6,075,899 A * | 6/2000 | Yoshioka et al. ............. 382/233 |
| 6,104,751 A * | 8/2000 | Artieri ...................... 375/240.14 |
| 2002/0083292 A1 | 6/2002 | Isomura |

FOREIGN PATENT DOCUMENTS

EP    1741296    1/2007

* cited by examiner

*Primary Examiner* — Hau Nguyen
(74) *Attorney, Agent, or Firm* — Winston Hsu; Scott Margo

(57) ABSTRACT

A memory address mapping method of controlling storage of images in a memory device is provided. The memory device includes banks each having a plurality of pages. The memory address mapping method includes: receiving a first image; and referring to an image partition setting to generate a first memory address setting for each horizontal line partition in the first image, wherein the image partition setting defines that one image is divided into horizontal line groups each having at least one horizontal line, and each of the horizontal line groups is divided into horizontal line partitions in a horizontal line direction. First memory address settings of the horizontal line partitions in each horizontal line group of the first image control that a corresponding horizontal line group having the horizontal line partitions included therein is not stored into a same bank of the memory device.

24 Claims, 10 Drawing Sheets

| BA_11, PA_11 | BA_12, PA_12 | BA_13, PA_13 | ... | BA_1L-1, PA_1L-1 | BA_1L, PA_1L |
|---|---|---|---|---|---|
| 304_11 | 304_12 | 304_13 | | 304_1L-1 | 304_1L |
| 404_11 | 404_12 | 404_13 | | 404_1L-1 | 404_1L |

| BA_11, PA_11 | 304_11 | 404_11 | 504_11 | 604_11 | BA_12, PA_12 | 304_12 | 404_12 | 504_12 | 604_12 | BA_13, PA_13 | 304_13 | 404_13 | 504_13 | 604_13 | ... | BA_1L-1, PA_1L-1 | 304_1L-1 | 404_1L-1 | 504_1L-1 | 604_1L-1 | BA_1L, PA_1L | 304_1L | 404_1L | 504_1L | 604_1L |
|---|---|---|---|---|---|---|---|---|---|---|---|---|---|---|---|---|---|---|---|---|---|---|---|---|---|
| BA_21, PA_21 | 304_21 | 404_21 | 504_21 | 604_21 | BA_22, PA_22 | 304_22 | 404_22 | 504_22 | 604_22 | BA_23, PA_23 | 304_23 | 404_23 | 504_23 | 604_23 | ... | BA_2L-1, PA_2L-1 | 304_2L-1 | 404_2L-1 | 504_2L-1 | 604_2L-1 | BA_2L, PA_2L | 304_2L | 404_2L | 504_2L | 604_2L |

FIG. 6

| BA_11, PA_11 | 304_11 | 404_11 | 504_11 | 604_11 | BA_21, PA_21 | 704_11 | 304_21 | 404_21 | 504_21 |
| BA_12, PA_12 | 304_12 | 404_12 | 504_12 | 604_12 | BA_22, PA_22 | 704_12 | 304_22 | 404_22 | 504_22 |
| BA_13, PA_13 | 304_13 | 404_13 | 504_13 | 604_13 | BA_23, PA_23 | 704_13 | 304_23 | 404_23 | 504_23 |
| ⋮ | | | | | ⋮ | | | | |
| BA_1L-1, PA_1L-1 | 304_1L-1 | 404_1L-1 | 504_1L-1 | 604_1L-1 | BA_2L-1, PA_2L-1 | 704_1L-1 | 304_2L-1 | 404_2L-1 | 504_2L-1 |
| BA_1L, PA_1L | 304_1L | 404_1L | 504_1L | 604_1L | BA_2L, PA_2L | 704_1L | 304_2L | 404_2L | 504_2L |

FIG. 7

| Chroma | | | | | | |
|---|---|---|---|---|---|---|
| BA_11', PA_11' | BA_12', PA_12' | BA_13', PA_13' | ...... | BA_1L-1', PA_1L-1' | BA_1L', PA_1L' |
| 304_11" | 304_12" | 304_13" | | 304_1L-1" | 304_1L" |

| Luma | | | | | | |
|---|---|---|---|---|---|---|
| BA_11, PA_11 | BA_12, PA_12 | BA_13, PA_13 | ...... | BA_1L-1, PA_1L-1 | BA_1L, PA_1L |
| 304_11' | 304_12' | 304_13' | | 304_1L-1' | 304_1L' |

MEMORY ADDRESS MAPPING METHOD FOR CONTROLLING STORAGE OF IMAGES IN MEMORY DEVICE AND MEMORY ADDRESS MAPPING CIRCUIT THEREOF

CROSS REFERENCE TO RELATED APPLICATIONS

This application claims the benefit of U.S. provisional application No. 61/255,898, filed on Oct. 29, 2009 and incorporated herein by reference.

BACKGROUND

The disclosed embodiments of the present invention relate to storing data into a memory device, and more particularly, to a memory address mapping method for controlling storage of images (e.g., fields) in a memory device by using a bank interleaving technique and memory address mapping circuit thereof.

Dynamic random access memory (DRAM) is a type of random access memory that stores each bit of data in a capacitor which serves as a memory cell. FIG. 1 is a diagram illustrating a conventional configuration of a DRAM device. The DRAM device 100 includes a plurality of row decoders 102_1-102_N, a plurality of column decoders 104_1-104_N, a plurality of banks 106_1-106_N, and a plurality of sense amplifiers 108_1-108_N. Each of the banks 106_1-106_N is accessed via one dedicated row decoder, one dedicated column decoder, and one dedicated sense amplifier, and includes a plurality of rows (i.e., pages) 110. The DRAM address for a memory cell may include a row address ADD_R, a column address ADD_C, and a bank address ADD_BA. The bank address ADD_BA determines which bank is selected, and the row address ADD_R determines which row (page) in the selected bank is selected. After bits located in the selected row (page) are loaded into the sense amplifier corresponding to the selected bank, the column address ADD_C determines which bit in the loaded bits contains information of the desired memory cell to be accessed. For example, in a case where the memory cell with a row address R1 and a column address C1 in bank 106_1 is a target memory cell to be accessed, the bank address ADD_BA selects the bank 106_1, the row decoder 102_1 corresponding to the bank 106_1 decodes the row address ADD_R to select a target row with the row address R1, the sense amplifier 108_1 corresponding to the bank 106_1 reads the target row, and then the column decoder 104_1 decodes the column address ADD_C to select a target bit addressed by the column address C1.

As shown in FIG. 1, each of the banks has its own sense amplifier, thereby allowing each of the banks to work independently. However, the bank conflict (or page miss) often causes the most significant performance degradation of the DRAM access. The bank conflict means that successive DRAM accesses are to access different rows in the same bank. To put it another way, as the row decoder for each bank is capable of accessing only one row in the corresponding bank, successive DRAM accesses on different rows of the same bank inevitably cause the bank conflict. For example, regarding bits loaded into the sense amplifier due to a current DRAM read request, a pre-charge command should be firstly issued to inform the sense amplifier to write stored bits back to the corresponding row. Secondly, an activation of another row to be accessed by the next DRAM read request is performed after the pre-charging is finished. It should be noted that several idle cycles must be inserted into two consecutive commands, where the number of idle cycles depends on types of the consecutive commands. In general, there is a pre-charge-to-active latency $T_{RP}$ between the pre-charge command and the activation command. After the row is activated, a read command should be issued. Similarly, there is an active-to-read latency $T_{RCD}$ between the activation command and the read command. In the end, the requested data will be shown on a data bus after a read-to-data latency $T_{CAS}$. Briefly summarized, when the bank conflict (page miss) occurs, the activation of the page accessed by the next DRAM access must wait until pre-charging of contents of the page loaded in the sense amplifier by the current DRAM access (i.e., writing contents in the sense amplifier back to the corresponding page accessed by the current DRAM access) is finished. As one can see, data is successfully accessed after several idle cycles due to the pre-charge-to-active latency $T_{RP}$, the active-to-read latency $T_{RCD}$, and the read-to-data latency $T_{CAS}$. If the bank conflict occurs frequently, the DRAM performance will be dramatically degraded.

In certain image processing applications (e.g., temporal noise reduction, motion adaptive de-interlacing, motion judder cancellation, and super-resolution scaling), the information which lies within temporally neighboring images may be referenced. However, when more images are used as references, more DRAM bandwidth is required. Unfortunately, higher requirement of the DRAM bandwidth usually implies higher hardware cost. In order to lower the hardware cost without reducing the number of reference images, raising the DRAM efficiency becomes one possible solution. As mentioned above, the bank conflict (page miss) is a key factor of the DRAM efficiency degradation. How to effectively reduce the occurrence of bank conflicts during the DRAM accesses becomes an important issue to be solved by designers in this field.

SUMMARY

In accordance with exemplary embodiments of the present invention, a memory address mapping method for controlling storage of images in a memory device by using a bank interleaving technique and related memory address mapping circuit thereof are proposed to solve the above-mentioned problem.

According to a first aspect of the present invention, an exemplary memory address mapping method of controlling storage of a plurality of images in a memory device is provided. The memory device includes a plurality of banks each having a plurality of pages. The exemplary memory address mapping method includes: receiving a first image; and referring to an image partition setting to generate a first memory address setting for each horizontal line partition in the first image, wherein the image partition setting defines that one image is divided into a plurality of horizontal line groups each having at least one horizontal line, and each of the horizontal line groups is divided into a plurality of horizontal line partitions in a horizontal line direction. A plurality of first memory address settings of the horizontal line partitions in each horizontal line group of the first image control that a corresponding horizontal line group having the horizontal line partitions included therein is not stored into a same bank of the memory device.

According to a second aspect of the present invention, an exemplary memory address mapping circuit of controlling storage of a plurality of images in a memory device is provided. The memory device includes a plurality of banks each having a plurality of pages. The exemplary memory address mapping circuit includes a receiving unit and an address generating unit. The receiving unit is utilized for receiving a first image. The address generating unit is coupled to the receiving unit, and utilized for referring to an image partition setting to generate a first memory address setting for each horizontal line partition in the first image, where the image partition setting defines that one image is divided into a plurality of horizontal line groups each having at least one horizontal line, and each of the horizontal line groups is divided into a plurality of horizontal line partitions in a horizontal line direction. A plurality of first memory address settings of the horizontal line partitions in each horizontal line group of the first image control that a corresponding horizontal line group having the horizontal line partitions included therein is not stored into a same bank of the memory device.

According to a third aspect of the present invention, an exemplary memory address mapping method of controlling storage of a plurality of images in a memory device is provided. The memory device includes a plurality of banks each having a plurality of pages. The exemplary memory address mapping method includes: receiving a first image and a second image; and referring to an image partition setting to generate a first memory address setting for each horizontal line partition in the first image, and referring to the image partition setting to generate a second memory address setting for each horizontal line partition in the second image, wherein the image partition setting defines that one image is divided into a plurality of horizontal line groups each having at least one horizontal line, and each of the horizontal line groups is divided into a plurality of horizontal line partitions in a horizontal line direction. A first memory address setting of a first horizontal line partition in the first image and a second memory address setting of a second horizontal line partition in the second image control that the first horizontal line partition and the second horizontal line partition co-located in different images are both stored into a same page.

According to a fourth aspect of the present invention, an exemplary memory address mapping circuit of controlling storage of a plurality of images in a memory device is provided. The memory device includes a plurality of banks each having a plurality of pages. The exemplary memory address mapping circuit includes a receiving unit and an address generating unit. The receiving unit is utilized for receiving a first image and a second image. The address generating unit is coupled to the receiving unit, and utilized for referring to an image partition setting to generate a first memory address setting for each horizontal line partition in the first image, and referring to the image partition setting to generate a second memory address setting for each horizontal line partition in the second image, wherein the image partition setting defines that one image is divided into a plurality of horizontal line groups each having at least one horizontal line, and each of the horizontal line groups is divided into a plurality of horizontal line partitions in a horizontal line direction. A first memory address setting of a first horizontal line partition in the first image and a second memory address setting of a second horizontal line partition in the second image control that the first horizontal line partition and the second horizontal line partition co-located in different images are both stored into a same page.

According to a fifth aspect of the present invention, an exemplary memory address mapping method of controlling storage of a plurality of images in a memory device is disclosed. The memory device includes a plurality of banks each having a plurality of pages. The exemplary memory address mapping method includes: receiving an image, and referring to an image partition setting to generate a memory address setting for each horizontal line partition in the image, wherein the image partition setting defines that one image is divided into a plurality of horizontal line groups each having at least one horizontal line, and each of the horizontal line groups is divided into a plurality of horizontal line partitions in a horizontal line direction. First memory address settings of a first horizontal line partition and a second horizontal line partition control that the first horizontal line partition and the second horizontal line partition, which are included in different horizontal line groups of the image and adjacent to each other in the image, are stored in a first page and a second page, respectively. In addition, the first page and the second page are located in different banks of the memory device.

According to a sixth aspect of the present invention, an exemplary memory address mapping circuit of controlling storage of a plurality of images in a memory device is disclosed. The memory device includes a plurality of banks each having a plurality of pages. The exemplary memory address mapping circuit includes: a receiving unit, for receiving an image; and an address generating unit, coupled to the receiving unit, for referring to an image partition setting to generate a first memory address setting for each horizontal line partition in the image, wherein the image partition setting defines that one image is divided into a plurality of horizontal line groups each having at least one horizontal line, and each of the horizontal line groups is divided into a plurality of horizontal line partitions in a horizontal line direction. First memory address settings of a first horizontal line partition and a second horizontal line partition control that the first horizontal line partition and the second horizontal line partition, which are included in different horizontal line groups of the image and adjacent to each other in the image, are stored in a first page and a second page, respectively. In addition, the first page and the second page are located in different banks of the memory device.

According to a seventh aspect of the present invention, an exemplary memory address mapping method of controlling storage of a plurality of images in a memory device is disclosed. The memory device includes a plurality of banks each having a plurality of pages. The exemplary memory address mapping method includes: receiving a first image; referring to an image partition setting to generate a first memory address setting for each horizontal line partition in the first image, wherein the image partition setting defines that one image is divided into a plurality of horizontal line groups each having at least one horizontal line, and each of the horizontal line groups is divided into a plurality of horizontal line partitions in a horizontal line direction; receiving a second image; and referring to the image partition setting to generate a second memory address setting for each horizontal line partition in the second image. A first memory address setting of a first horizontal line partition and a second memory address setting of a second horizontal line partition control that the first horizontal line partition and the second horizontal line partition co-located in the first image and the second image are stored in a first page and a second page, respectively. In addition, the first page and the second page are located in different banks of the memory device.

According to an eighth aspect of the present invention, an exemplary memory address mapping circuit of controlling storage of a plurality of images in a memory device is disclosed. The memory device includes a plurality of banks each having a plurality of pages. The exemplary memory address mapping circuit includes: a receiving unit for receiving a first image and a second image; and an address generating unit, coupled to the receiving unit, for referring to an image partition setting to generate a first memory address setting for each horizontal line partition in the first image, and referring to the image partition setting to generate a second memory address setting for each horizontal line partition in the second image, wherein the image partition setting defines that one image is divided into a plurality of horizontal line groups each having at least one horizontal line, and each of the horizontal line groups is divided into a plurality of horizontal line partitions in a horizontal line direction. A first memory address setting of a first horizontal line partition and a second memory address setting of a second horizontal line partition control that the first horizontal line partition and the second horizontal line partition co-located in the first image and the second image are stored in a first page and a second page, respectively. In addition, the first page and the second page are located in different banks of the memory device.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a diagram illustrating one exemplary embodiment of one horizontal line group stored in the memory device.

FIG. 5 is a diagram illustrating one exemplary embodiment of a plurality of horizontal line groups stored in the memory device.

FIG. 6 is a diagram illustrating another exemplary embodiment of a plurality of horizontal line groups stored in the memory device.

FIG. 7 is a diagram illustrating yet another exemplary embodiment of a plurality of horizontal line groups stored in the memory device.

FIG. 9 is a diagram illustrating an exemplary embodiment of one horizontal line group with luminance data and chrominance data separately stored in the memory device.

FIG. 10 is a diagram illustrating another exemplary embodiment of one horizontal line group with luminance data and chrominance data separately stored in the memory device.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Regarding image processing applications which use temporally neighboring images as references, pixels in temporally neighboring images may be read from a memory device (e.g., a DRAM device). In a conventional design, pixels of one image (e.g., one field) are stored into the memory device in a raster scan order. Therefore, accessing pixels (e.g., co-located pixels) in temporally neighboring images may encounter a bank conflict problem frequently. The conception of the present invention is to use a bank interleaving technique to store each image, where each horizontal line is not stored in a same page of a bank. Specifically, the proposed bank interleaving technique takes advantage of the parallelism of the independent sense amplifiers of the banks. Thus, pixels of one image are not stored into the memory device in a conventional raster scan order. In this way, the number of bank conflicts occurring during successive accesses of the memory device can be reduced, and the access efficiency of the memory device is improved accordingly. Further details will be described as follows.

Figure 1:
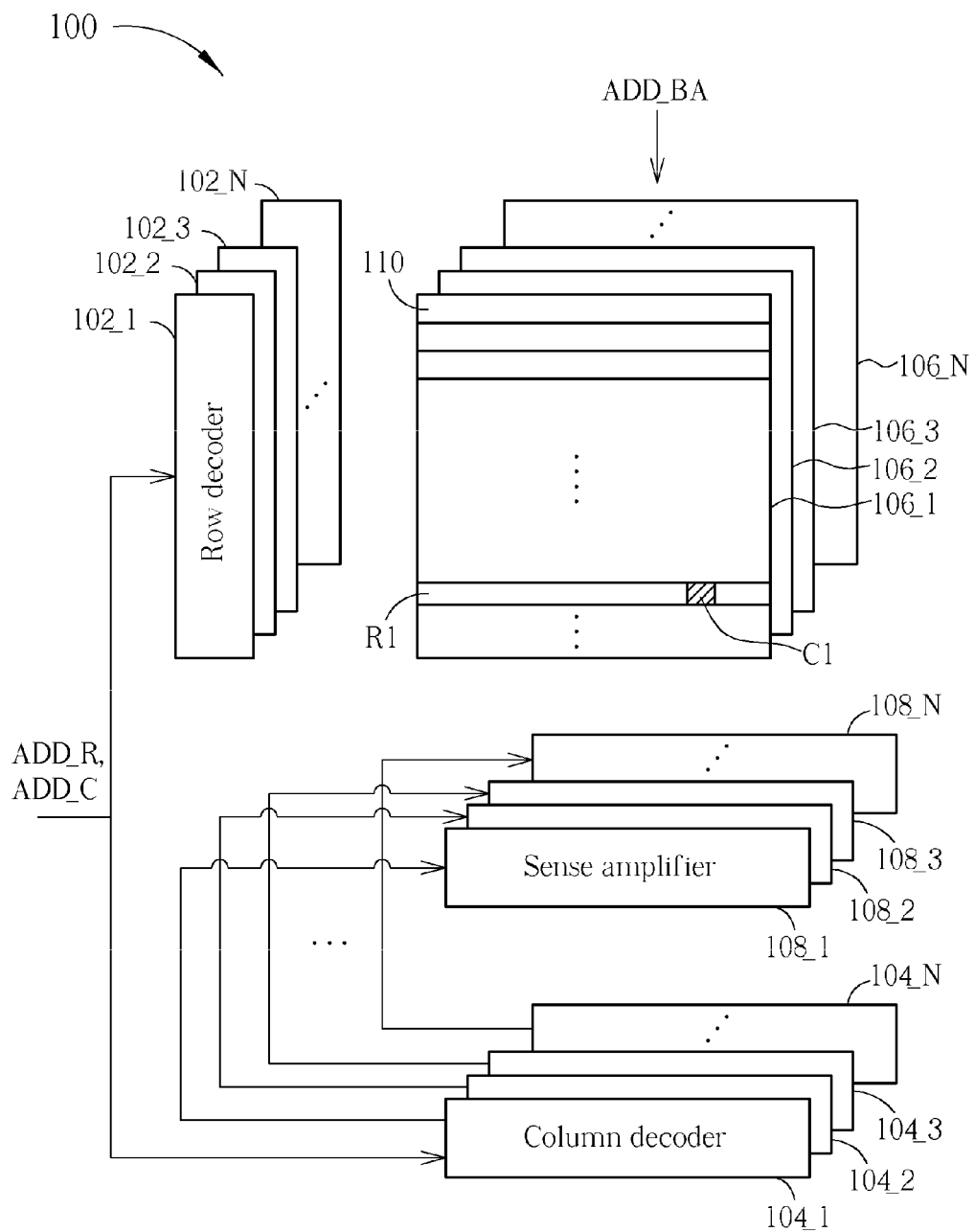
FIG. 1 is a diagram illustrating a conventional configuration of a DRAM device.
Figure 2:
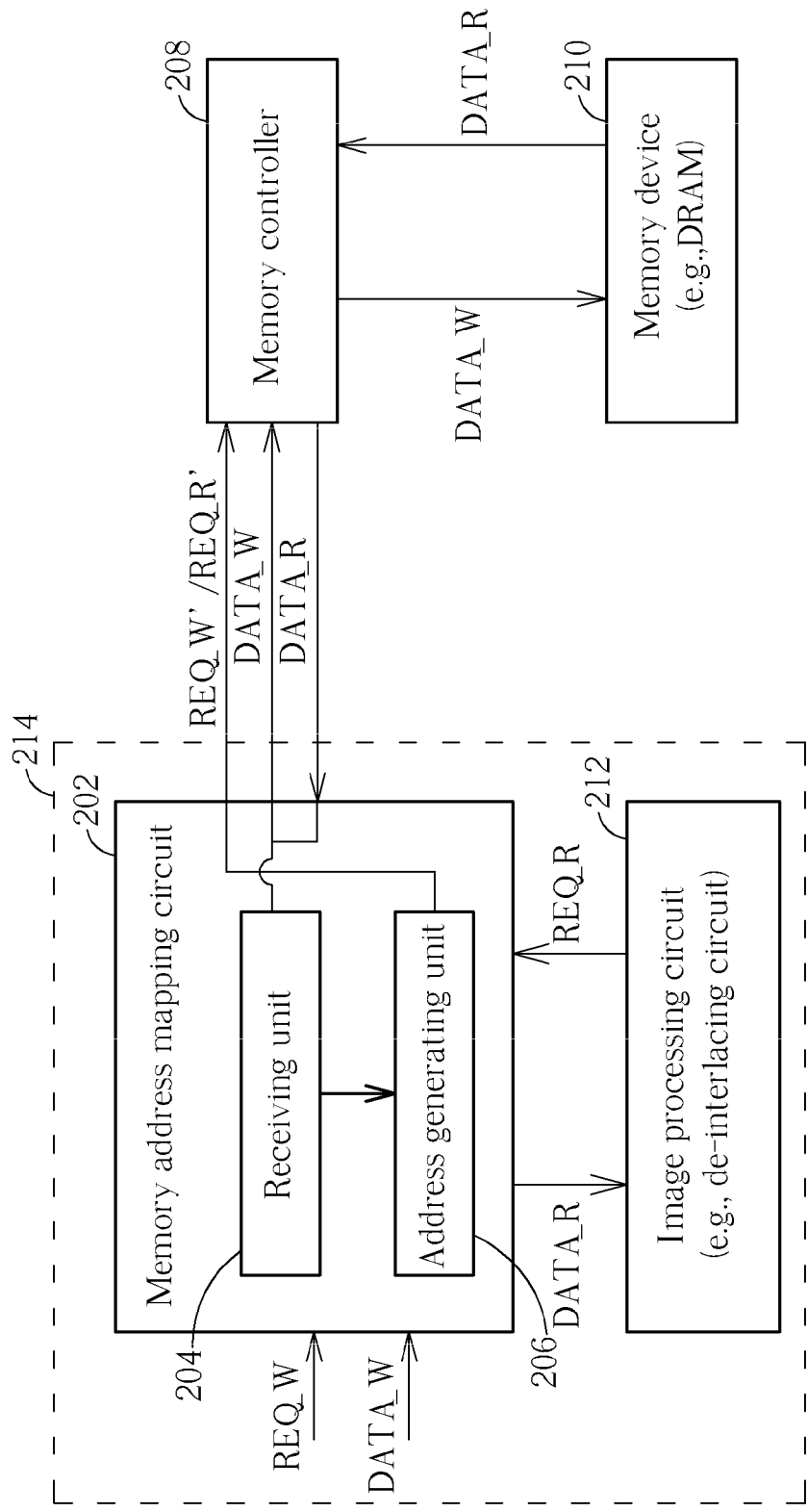
FIG. 2 is a diagram illustrating an exemplary implementation of a memory address mapping circuit of controlling storage of a plurality of images in a memory device according to the present invention.

FIG. 2 is a diagram illustrating an exemplary implementation of a memory address mapping circuit of controlling storage of a plurality of images in a memory device according to the present invention. When receiving a write request REQ_W and a write data (e.g., an image data) DATA_W, the memory address mapping circuit 202 generates a memory device request REQ_W', including a memory address setting of the write data DATA_W, and outputs the write data DATA_W and the memory device request REQ_W' to a memory controller 208. It should be noted that the memory address setting of the write data DATA_W is set by the memory address mapping circuit 202 according to a predetermined bank interleaving rule. The memory controller 208 controls a memory device 210 to store the write data DATA_W according to the memory device request REQ_W'. In this exemplary embodiment, the memory device 210 may be implemented using the DRAM device 100 shown in FIG. 1. Thus, the memory device 210 may include a plurality of banks each having a plurality of pages.

In addition, when an image processing circuit (e.g., a de-interlacing circuit) 212 generates a read request REQ_R to request a read data DATA_R from the memory device 210, the memory address mapping circuit 202 generates a memory device request REQ_R', including a memory address setting of the read data DATA_R, according to the predetermined bank interleaving rule referenced for controlling storage of image data in the memory device 210, and outputs the memory device request REQ_R' to the memory controller 208. The memory controller 208 controls the memory device (e.g., a DRAM device) 210 to output the requested read data DATA_R according to the memory device request REQ_R' generated from the memory address mapping circuit 202. Next, the read data DATA_R is transmitted to the image processing circuit 212 via the memory address mapping circuit 202.

In this exemplary embodiment, the memory address mapping circuit 202 and the image processing circuit 212 may integrated in a single chip 214, where the memory address mapping circuit 202 serves as an interface for controlling the mapping between the memory address and the data written into/read from the memory device 210. It should be noted that the chip 214 may include other processing circuits, such as a demodulation unit, a video decoder, etc. The operation of the memory address mapping circuit 202 is detailed as follows.

The memory address mapping circuit 202 is configured to process a video stream including a plurality of images (e.g., fields). In this exemplary embodiment, the memory address mapping circuit 202 includes, but is not limited to, a receiving unit 204 and an address generating unit 206. The receiving unit 204 is configured to receive the above-mentioned memory device requests REQ_R and REQ_W, read data DATA_R, and write data DATA_W. Regarding the storage of a first image in the memory device 210, the receiving unit 204 receives the first image transmitted via the video stream, and the address generating unit 206, coupled to the receiving unit 204, is used for referring to an image partition setting to generate a first memory address setting for each horizontal line partition in the first image. Please note that the first memory address setting includes any memory addresses, such as bank addresses, row addresses, and/or column addresses, required to request the memory controller 208 to properly store the pixels of the horizontal line partition into the memory device 210 without violating the bank interleaving requirements of the present invention.

It should be noted that the same image partition setting will be applied to a plurality of images each having the same image resolution. For example, each image is either an odd field or an even field with a resolution being 720×240, 1280×510, or 1280×540. Please refer to FIG. 3, which is a diagram illustrating an exemplary image partition setting of an image. As shown in the figure, the exemplary image partition setting defines that the image 300 is divided into a plurality of horizontal line groups 302_1, . . . , 302_K each having at least one horizontal line, and each of the horizontal line groups 302_1, . . . , 302_K is divided into a plurality of horizontal line partitions in a horizontal line direction. For example, the horizontal line group 302_1 is divided into horizontal line partitions 304_11, . . . , 304_1L, the horizontal line group 302_2 is divided into horizontal line partitions 304_21, . . . , 304_2L, and so on. Regarding each of other images 400-700 having an image resolution identical to that of the image 300, the same exemplary image partition setting is applied thereto. Taking the images 300 and 400 for example, a horizontal line group 402_1 is defined in the image 400 and located in a position identical to a position where the horizontal line group 302_1 is located in the image 300. In other words, according to the same image partition setting, the horizontal line groups 302_1 and 402_1 are co-located in images 300 and 400; in addition, the horizontal line group 402_1 is divided into horizontal line partitions 404_11, . . . , 404_1L, where horizontal line partitions 304_11 and 404_11 are co-located horizontal line partitions, horizontal line partitions 304_12 and 404_12 are co-located horizontal line partitions, and so on. In should be noted that the number of horizontal line groups per image and/or the number of horizontal line partitions per horizontal line group may be adjustable.

Figure 4:
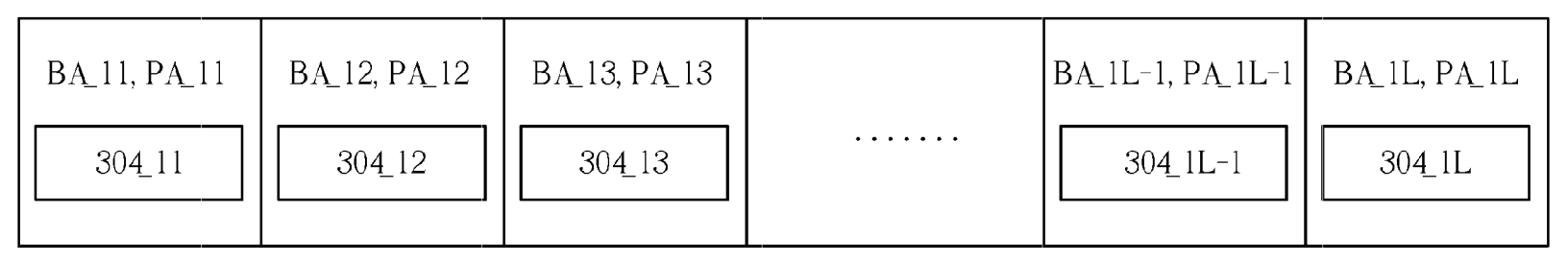

As mentioned above, in certain image processing applications, the information which lies within temporally neighboring images may be referenced. Specifically, a specific image processing application may read the information derived from one horizontal line selected from each of the temporally neighboring images. As the same horizontal line is partitioned and distributed in multiple horizontal line partitions of the same horizontal line group according to the exemplary image partition setting shown in FIG. 3, the address generating unit 206 generates a plurality of first memory address settings for the horizontal line partitions in each horizontal line group of the first image to control that a corresponding horizontal line group having the horizontal line partitions included therein is not stored into a same bank of the memory device 210. More specifically, the address generating unit 206 generates first memory address settings for adjacent horizontal line partitions of the same horizontal line group in the first image, respectively, where the first memory address settings of the adjacent horizontal line partitions control that the adjacent horizontal line partitions are stored into different banks of the memory device, respectively. Please refer to FIG. 4, which shows one exemplary embodiment of one horizontal line group stored in the memory device 210. Taking the horizontal line group 302_1 in FIG. 3 for example, the horizontal line partitions 304_11, . . . , 304_1L are respectively stored in page PA_11 of bank BA_11, . . . , page PA_1L of bank BA_1L, as shown in FIG. 4. It should be noted that banks for storing adjacent horizontal line partitions are different due to bank interleaving. For example, banks BA_11 and BA_12 are different, banks BA_12 and BA_13 are different, and banks BA_1L−1 and BA_1L are different. In addition, each of the banks BA_11, . . . , BA_1L is selected from banks available in the memory device 210. For example, if the memory device 210 has four banks BANK_0, BANK_1, BANK_2, and BANK_3, each of the banks BA_11, . . . , BA_1L is one of the banks BANK_0, BANK_1, BANK_2, and BANK_3. In this way, the number of bank conflicts can be effectively reduced when information of one horizontal line is accessed. Moreover, in this example shown in FIG. 4, the pages PA_11, . . . , PA_1L may correspond to the same page number or different page numbers, depending upon design requirements. That is, as long as the adjacent horizontal line partitions in the same horizontal line group are respectively stored into different banks, the selection of pages used in different banks for storing the adjacent horizontal line partitions is not limited.

Figure 3:
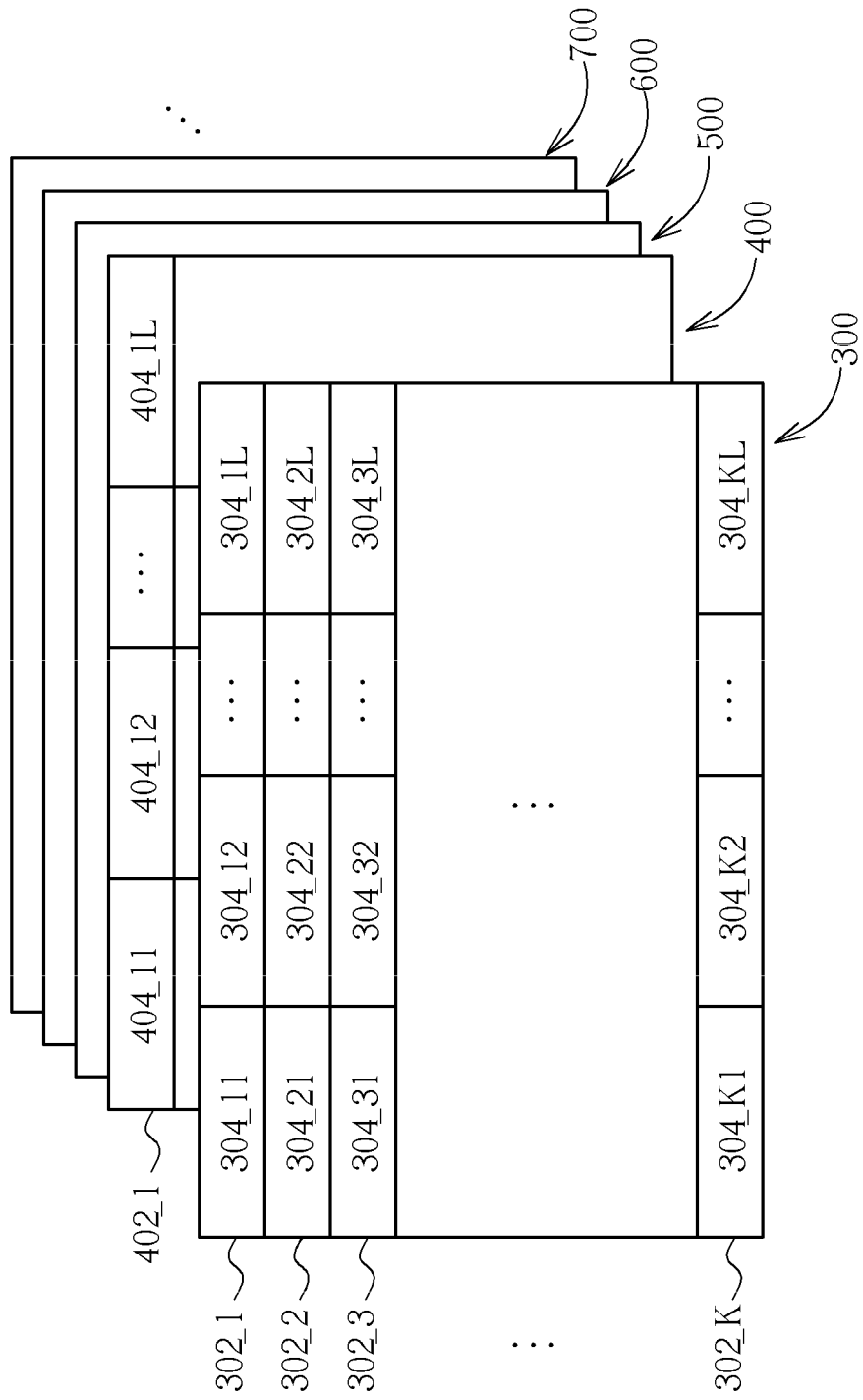
FIG. 3 is a diagram illustrating an exemplary image partition setting of an image.

As mentioned above, regarding each horizontal line group in one image, the memory address setting set by the address generating circuit 206 makes adjacent horizontal line partitions respectively stored into different banks of the memory device 210. By way of example, but not limitation, multiple horizontal line partitions co-located in different images are preferably stored in the same page. In a case where information derived from multiple horizontal line partitions co-located in different images is used as a reference, all the required information therefore can be read from the same page in a bank without reading pages in other banks. As the undesired latencies needed to successfully read data from pages in other banks can be avoided, the access efficiency of the memory device 210 can be further improved. As shown in FIG. 3, horizontal line partitions 304_11 and 404_11 are co-located in images 300 and 400, horizontal line partitions 304_12 and 404_12 are co-located in images 300 and 400, and so on. As shown in FIG. 5, memory address settings set by the address generating unit 206 therefore make horizontal line partitions 304_11 and 404_11 stored in the same page PA_11 of bank BA_11. Similarly, with the proper memory mapping controlled by the address generating unit 206, horizontal line partitions 304_12 and 404_12 are stored into the same page PA_12 of bank BA_12, horizontal line partitions 304_13 and 404_13 are stored into the same page PA_13 of bank BA_13, and so on.

Consider a case where information derived from temporally neighboring image (e.g., three images) which have been stored in the memory device 210 will be referenced when information of one incoming image is being stored into the memory device 210. In other words, a storage space of four image buffers is allocated in the memory device 210, where a size of each image buffer is equal to a data size of one image, and a data overwrite operation will be performed upon one of the image buffers for storing a new image when the image buffers are full. In addition, assume that the size of each page in the memory device 210 is equal to the sum of sizes of four horizontal line partitions. Please refer to FIG. 6, which shows a plurality of horizontal line groups stored in the memory device 210. According to above disclosure directed to controlling the storage of multiple horizontal line partitions co-located in different images, horizontal line partitions 304_11, 404_11, 504_11, and 604_11 co-located in different images 300, 400, 500, and 600 are controlled to be stored in page PA_11 of bank BA_11 according to memory address settings set by the address generating unit 206, horizontal line partitions 304_21, 404_21, 504_21, and 604_21 co-located in different images 300, 400, 500, and 600 are controlled to be stored in page PA_21 of bank BA_21 according to memory address settings set by the address generating unit 206, and so on. It should be noted that the horizontal line group 302_1, including the horizontal line partitions 304_11, . . . , 304_1L, and the horizontal line group 302_2, including the horizontal line partitions 304_21, . . . , 304_2L, are adjacent to each other in the same image 300; the horizontal line group, including the horizontal line partitions 404_11, . . . , 404_1L, and the horizontal line group, including the horizontal line partitions 404_21, . . . , 404_2L, are adjacent to each other in the same image 400; the horizontal line group, including the horizontal line partitions 504_11, . . . , 504_1L, and the horizontal line group, including the horizontal line partitions 504_21, . . . , 504_2L, are adjacent to each other in the same image 500; and the horizontal line group, including the horizontal line partitions 604_11, . . . , 604_1L, and the horizontal line group, including the horizontal line partitions 604_21, . . . , 604_2L, are adjacent to each other in the same image 600. In accordance with the bank interleaving technique applied to the horizontal line partitions shown in FIG. 5, banks for storing adjacent horizontal lines of the same horizontal line group are different. With regard to the example shown in FIG. 6, the same bank interleaving technique is also applied to adjacent horizontal lines of the same horizontal line group.

Suppose that images 300, 400, and 500 have been stored into the memory device 210 and the image 600 is currently being stored into the memory device 210. Therefore, information derived from stored images 300, 400, and 500 will be referenced when a specific image processing application (e.g., de-interlacing) is active. For example, pixel data of three pixels co-located in images 300, 400, and 500 may be read from the memory device 210 to serve as references. As the horizontal line partitions co-located in different images are stored in the same bank according the example of FIG. 6, reading pixel data of three pixels co-located in images 300, 400, and 500 would not encounter any bank conflict. However, it is possible that pixel data of four pixels, not co-located in images 300, 400, and 500, may be read from the memory device 210 to serve as references. For example, the reference pixels may be located in horizontal line partitions 304_11, 404_21, and 504_21, respectively. Thus, reading pixel data of three pixels, not totally co-located in images 300, 400, and 500, may encounter a bank conflict if the requested pixel data are stored in different pages of the same bank. To avoid this, the bank interleaving technique applied to the horizontal line partitions shown in FIG. 6 may also control that horizontal line partitions, which are included in different horizontal line groups of the same image and adjacent to each other, and cannot be stored in the same page of a bank, are stored in different banks through proper control of the memory address settings. Thus, the banks BA_11 and BA_21 are different banks of the memory device 210, the banks BA_12 and BA_22 are different banks of the memory device 210, and so on.

Consider another case where information derived from temporally neighboring images (e.g., four images) which have been stored in the memory device will be referenced when information of one incoming image is being stored into the memory device. In other words, a storage space of five image buffers is allocated in the memory device 210. In addition, assume that the size of each page in the memory device 210 is equal to the sum of sizes of four horizontal line partitions. As page PA_11 in bank BA_11 has no available storage space to store additional horizontal line partitions when horizontal line partitions 304_11, 404_11, 504_11, and 604_11 co-located in images 300, 400, 500, and 600 are stored therein, the horizontal line partition 704_11 co-located in image 700 is controlled to be stored in page PA_21 of bank BA_21, as shown in FIG. 7. For the same reason, other horizontal line partitions 704_12, . . . , 704_1L11 in the image 700 are controlled to be stored in page PA_22 of bank BA_22, . . . , page PA_2L of bank BA_2L, respectively. As the horizontal line partition 704_11 is controlled to be stored in page PA_21 of bank BA_21, only horizontal line partitions 304_21, 404_21, and 504_21 co-located in images 300, 400, and 500 can be stored in the same page PA_21 of bank BA_21. Similarly, only horizontal line partitions 304_22, 404_22, and 504_22 co-located in images 300, 400, and 500 can be stored in the same page PA_22 of bank BA_22, only horizontal line partitions 304_23, 404_23, and 504_23 co-located in images 300, 400, and 500 can be stored in the same page PA_23 of bank BA_23, and so on. As can be seen from FIG. 7, there are horizontal line partitions co-located in different images that are not stored in the same page of a bank. Suppose that information derived from four stored images will be referenced when a specific image processing application (e.g., de-interlacing) is active. For example, pixel data of four pixels co-located in four images may be read from the memory device 210 to serve as references. As the horizontal line partitions co-located in different images are not guaranteed to be stored in the same bank according the example of FIG. 7, reading pixel data of four pixels co-located in four images may encounter a bank conflict if the requested pixel information is stored in different pages of the same bank. To avoid the occurrence of such a bank conflict, the bank interleaving technique applied to the horizontal line partitions shown in FIG. 7 may also control that horizontal line partitions, which are co-located in different images and cannot be stored in the same page of a bank, are stored in different banks through proper control of the memory address settings. Thus, the banks BA_11 and BA_21 are different banks of the memory device 210, the banks BA_12 and BA_22 are different banks of the memory device 210, and so on.

Figure 8:
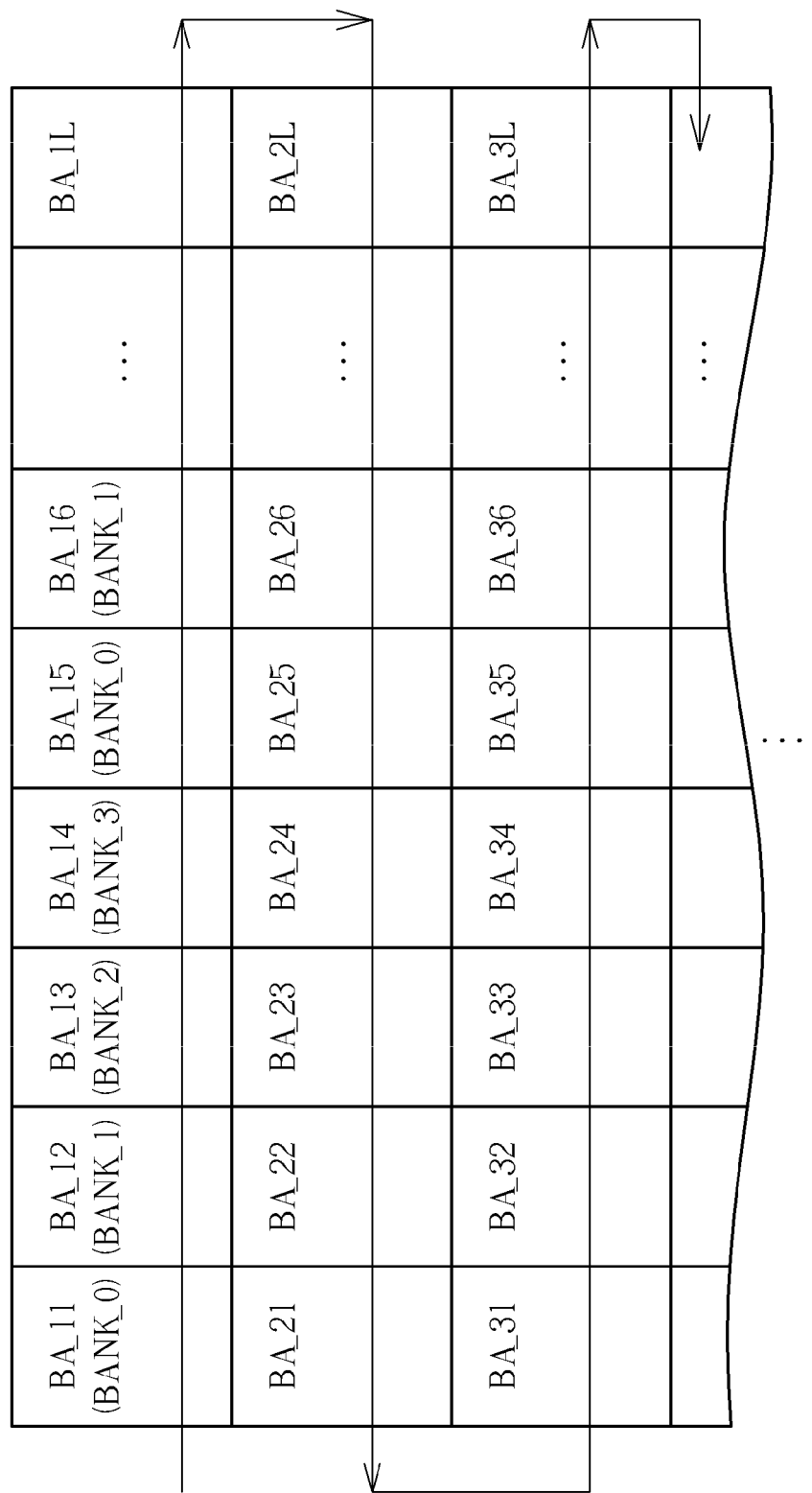
FIG. 8 is a diagram illustrating an exemplary embodiment of assigning the banks to satisfy the bank interleaving requirements.

Regarding the examples shown in FIG. 6 and FIG. 7, memory address settings of the horizontal line partitions are controlled by the address generating unit 206 to make the banks BA_11-BA_1L and BA_21-BA_2L satisfy the desired bank interleaving requirements for avoiding/reducing possible bank conflicts. FIG. 8 is a diagram illustrating an exemplary embodiment of assigning the banks to satisfy the bank interleaving requirements. Suppose that the memory device 210 only has four banks BANK_0, BANK_1, BANK_2, and BANK_3. The banks BANK_0, BANK_1, BANK_2, and BANK_3 are assigned in a cyclic order along the arrow direction shown in FIG. 8, thereby determining the interleaved banks BA_11-BA_1L, BA_21-BA_2L, and BA_31-BA_3L. In this way, regarding the example shown in FIG. 6, adjacent horizontal line partitions of the same horizontal group are guaranteed to be stored in different banks of the memory device, and horizontal line partitions, which are included in different horizontal line groups of the same image and adjacent to each other, and cannot be stored in the same page of a bank, are stored in different banks of the memory device 210. In other words, the desired bank interleaving requirements for avoiding/reducing possible bank conflicts are met. Besides, regarding the example shown in FIG. 7, adjacent horizontal line partitions of the same horizontal group are guaranteed to be stored in different banks of the memory device, and horizontal line partitions, which are co-located in different images and cannot be stored in the same page of a bank, are stored in different banks of the memory device 210. Thus, the desired bank interleaving requirements for avoiding/reducing possible bank conflicts are met.

However, it should be noted that the bank interleaving configuration shown in FIG. 8 merely serves as one feasible implementation. Any bank interleaving configuration can be employed as long as the desired bank interleaving requirements for avoiding/reducing possible bank conflicts are met.

Moreover, the above-mentioned examples are for illustrative purposes only, and are not meant to be limitations of the present invention. For example, in one alternative design where adjacent horizontal line partitions of the same horizontal group, as shown in FIG. 6, are not required to be stored in different banks of the memory device, an objective of reducing the bank conflict occurrence can be achieved by making horizontal line partitions, which are included in different horizontal line groups of the same image and adjacent to each other in the same image, stored in different banks of the memory device 210. By way of example, but not limitation, the adjacent horizontal line partitions 304_11 and 304_12 of the same horizontal group 302_1, as shown in FIG. 6, may be stored in the same bank (i.e., BA_11=BA_12) under this alternative design; however, the horizontal line partitions 304_11 and 304_12, which are included in different horizontal line groups 302_1 and 302_2 of the same image 300 and adjacent to each other, and cannot be stored in the same page of a bank, are controlled to be stored in different banks (i.e., BA_11≠BA_21) under this alternative design. Similarly, considering another alternative design where adjacent horizontal line partitions of the same horizontal group, as shown in FIG. 7, are not required to be stored in different banks of the memory device, the same objective of reducing the bank conflict occurrence can also be achieved by making horizontal line partitions, which are co-located in different images and cannot be stored in the same page of a bank, stored in different banks of the memory device 210. By way of example, but not limitation, the adjacent horizontal line partitions 604_11 and 604_12 of the same horizontal group, as shown in FIG. 7, may be stored in the same bank (i.e., BA_11=BA_2) under this alternative design; however, the horizontal line partitions 604_11 and 704_11, which are co-located in different images 600 and 700 and cannot be stored in the same page of a bank, are controlled to be stored in different banks BA_11 and BA_21 (i.e., BA_11≠BA_21) under this alternative design. These alternative designs all fall within the scope of the present invention.

Video systems convey image data in the form of one component that represents luminance and two components that represent color (chrominance). Because the human eye is less sensitive to color than luminance, bandwidth can be optimized by storing more luminance detail than color detail. At normal viewing distances, there is no perceptible loss incurred by sampling the color detail at a lower rate. Chroma subsampling is a common technique of implementing more resolution for the luminance information than the color information. For example, the chroma subsampling scheme may be 4:2:0 or 4:2:2. The memory address mapping circuit 202 may process the luminance information and the chrominance information separately to therefore adapt to different types of chroma formats. Please refer to FIG. 4 in conjunction with FIG. 9. FIG. 9 is a diagram illustrating an exemplary embodiment of one horizontal line group with luminance data and chrominance data separately stored in the memory device 210. Each of the horizontal line partitions 304_11, . . . , 304_1L included in the horizontal line group 302_1 shown in FIG. 3 includes luminance data and chrominance data. For example, as shown in FIG. 9, the horizontal line partition 304_11 includes the luminance data 304_11' and the chrominance data 304_11", the horizontal line partition 304_12 includes the luminance data 304_12' and the chrominance data 304_12", and so on. In the example shown in FIG. 4, luminance data and chrominance data of each horizontal line partition are stored in the same page of a bank. However, in the alternative design shown in FIG. 9, luminance data and chrominance data of each horizontal line partition are not stored in the same page of a bank. Though the luminance data and chrominance data of each horizontal line partitions are separately stored into different pages, the address generating unit 206 can employ the same bank interleaving technique applied to storing horizontal line partitions shown in FIG. 4, FIG. 5, FIG. 6 or FIG. 7 to control the luminance data storage and chrominance data storage of each horizontal line partition. Taking the luminance data storage and chrominance data storage of horizontal line partitions 304_11, . . . , 304_1L in the same horizontal line group 302_1 for example, luminance data of adjacent horizontal line partitions are stored in different banks, and chrominance data of adjacent horizontal line partitions are stored in different banks. The same objective of avoiding/reducing bank conflicts is achieved.

Regarding a television application, the precision of 10-bit per pixel may be required. However, the precision of 8-bit per pixel may be used in some cases in order to save the memory bandwidth. In view of this, the memory address mapping circuit 202 may be properly configured to be capable of supporting an adjustable pixel precision. Regarding each horizontal line partition, the receiving unit 204 derives a plurality of luminance data parts, including at least a most significant bit (MSB) luminance data part and a least significant bit (LSB) luminance data part, from the luminance data, and derives a plurality of chrominance data parts, including an MSB chrominance data part and an LSB chrominance data part, from the chrominance data, where the MSB luminance data part is a collection of MSBs of luminance information of a plurality of pixels in the horizontal line partition, the LSB luminance data part is a collection of LSBs of luminance information of the pixels in the horizontal line partition, the MSB chrominance data part is a collection of MSBs of chrominance information of the pixels in the horizontal line partition, and the LSB chrominance data part is a collection of LSBs of chrominance information of the pixels in the horizontal line partition. In addition, the memory address setting generated by the address generating unit 206 for the horizontal line partition controls that the MSB luminance data part and the LSB luminance data part are not stored in a same page, and the MSB chrominance data part and the LSB chrominance data part are not stored in a same page.

Suppose that the luminance data of each horizontal line partition is only divided into one MSB luminance data part and one LSB luminance data part and the chrominance data of each horizontal line partition is only divided into one MSB chrominance data part and one LSB chrominance data part. For example, 10-bit luminance/chrominance data of one pixel is divided into one 2-bit luminance/chrominance MSB part (i.e., MSBs) and an 8-bit luminance/chrominance LSB part (i.e., LSBs). Please refer to FIG. 10, which shows another exemplary embodiment of one horizontal line group with luminance data and chrominance data separately stored in the memory device 210. The horizontal line partitions 304_11, . . . , 304_1L included in the horizontal line group 302_1 shown in FIG. 3 include luminance data (e.g., 304_11', . . . , 304_1L' shown in FIG. 9) and chrominance data (e.g., 304_11", ..., 304_1L" shown in FIG. 9). In this example shown in FIG. 10, the luminance data 304_11 is separated into an MSB luminance data part 304_11'$_{MSB}$ and an LSB luminance data part 304_11'$_{LSB}$ which are controlled by a memory address setting for the horizontal line partition 304_11 to be respectively stored into page PA_11 of bank BA_11 and page PA_11" of bank BA_11", the luminance data 304_12 is separated into an MSB luminance data part 304_12'$_{MSB}$ and an LSB luminance data part 304_12'$_{LSB}$ which are controlled by a memory address setting for the horizontal line partition 304_12 to be respectively stored into page PA_12 of bank BA_12 and page PA_12" of bank BA_12", and so on. Similarly, the chrominance data 304_11" is separated into an MSB luminance data part 304_11"$_{MSB}$ and an LSB luminance data part 304_11"$_{LSB}$ which are controlled by the memory address setting for the horizontal line partition 304_11 to be respectively stored into page PA_11' of bank BA_11' and page PA_11''' of bank BA_11''', the luminance data 304_12 is separated into an MSB luminance data part 304_12"$_{MSB}$ and an LSB luminance data part 304_12"$_{LSB}$ which are controlled by the memory address setting for the horizontal line partition 304_11 to be respectively stored into page PA_11' of bank BA_11' and page PA_11''' of bank BA_11''', and so on.

Though the luminance data parts of the luminance data are separately stored into different pages and chrominance data parts of the chrominance data are separately stored into different pages, the address generating unit 206 can employ the same bank interleaving technique applied to storing horizontal line partitions shown in FIG. 4, FIG. 5, FIG. 6 or FIG. 7 to control the luminance data part storage and chrominance data part storage of each horizontal line partition. Taking the luminance data part storage and chrominance data part storage of horizontal line partitions 304_11, ..., 304_1L in the same horizontal line group 302_1 for example, MSB luminance data parts of adjacent horizontal line partitions are stored in different banks, LSB luminance data parts of adjacent horizontal line partitions are stored in different banks, MSB chrominance data parts of adjacent horizontal line partitions are stored in different banks, and LSB chrominance data parts of adjacent horizontal line partitions are stored in different banks. The same objective of avoiding/reducing bank conflicts is achieved.

Figure 10:
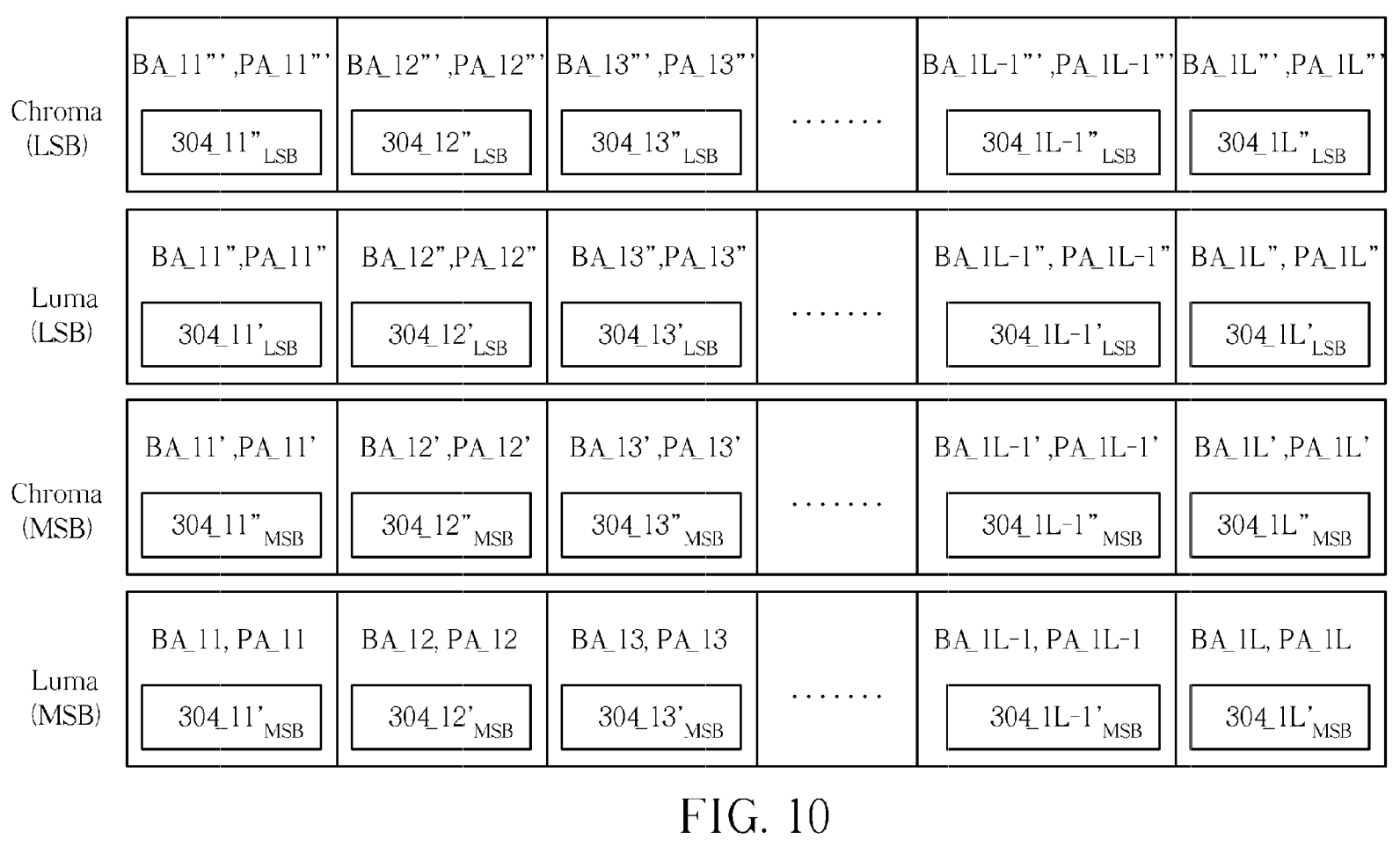

In a case where 10-bit pixel precision is used, a 2-bit MSB luminance part and an 8-bit luminance part of the luminance data of a requested reference pixel as well as a 2-bit MSB chrominance part and an 8-bit chrominance part of the chrominance data of the requested reference pixel are read from the memory device 210. As shown in FIG. 10, the MSB luminance data part, the LSB luminance data part, the MSB chrominance data part, and the LSB chrominance data part of the same horizontal line partition are stored in different pages. If at least two of the MSB luminance data part, the LSB luminance data part, the NSB chrominance data part, and the LSB chrominance data part of the same horizontal line partition are stored in the same bank, a bank conflict occurs. Therefore, in one exemplary design, the memory address setting generated by the address generating unit 206 for each horizontal line partition controls that the MSB luminance data part, the LSB luminance data part, the MSB chrominance data part, the LSB chrominance data part of the same horizontal line partition are stored in different banks, respectively. That is, banks BA_11, BA_11', BA_11", and BA_11' are different banks of the memory device 210, banks BA_2, BA_12', BA_12", and BA_12''' are different banks of the memory device 210, and so on.

Moreover, when the 10-bit pixel precision is changed to an 8-bit pixel precision, only an 8-bit luminance part of the luminance data of a requested reference pixel and an 8-bit chrominance part of the chrominance data of the requested reference pixel should be read from the memory device 210. As the MSB luminance data part, the LSB luminance data part, the MSB chrominance data part, the LSB chrominance data part of the same horizontal line partition are stored separately, the memory space of the MSB luminance data part and MSB chrominance data part can be released immediately.

Please note that in aforementioned exemplary embodiments horizontal line partitions/luminance data parts/chrominance data parts stored in the same page under the control the address generating unit 206 are not required to have a particular storage order. For example, the horizontal line partitions 304_11, 404_11, 504_11, and 604_11 may be stored in continuous memory addresses of page PA-11 according to the top-down order shown in FIG. 6. In an alternative design, the horizontal line partitions 304_11, 404_11, 504_11, and 604_11 may be stored in continuous memory addresses of page PA-11 according to a different order. Briefly summarized, as long as the bank interleaving requirements are satisfied, the arrangement of the horizontal line partitions/luminance data parts/chrominance data parts in a storage space of the same page is adjustable according to the actual design consideration.

As mentioned above, when the image processing circuit (e.g., a de-interlacing circuit) 212 generates a read request REQ_R to request a read data DATA_R from the memory device 210, the memory address mapping circuit 202 generates a memory device request REQ_R', including a memory address setting of the read data DATA_R, according to the predetermined bank interleaving rule referenced for controlling storage of image data in the memory device 210, and outputs the memory device request REQ_R' to the memory controller 208. Therefore, when a plurality of images are stored into the memory device 210 according to one of the exemplary bank interleaving rules shown in FIG. 4, FIG. 5, FIG. 6, FIG. 7, FIG. 9, and FIG. 10, the address generating unit 206 follows the same bank interleaving rule employed for controlling image data storage to thereby generate a memory address setting for reading requested data from the memory device 210. As a person skilled in the art can readily understand the read operation after reading above paragraphs directed to the data storage arrangement of the images in the memory device 210, further description is omitted here for brevity.

As shown in FIG. 1, each of the banks has its own sense amplifier, thereby allowing each of the banks to work independently. With the help of the bank interleaving technique, consecutive memory accesses will address different banks. Thus, a page which will be accessed by the next memory access can be pre-charged and active in advance to hide the latency cycles within the current memory access cycles. For example, the memory controller 208 shown in FIG. 2 may include a command queue for buffering read/write requests, which allows the memory controller 208 to look ahead. In addition to the aforementioned bank interleaving technique, a pre-charge/active high priority (PAPRI) function may be employed to further improve the access efficiency of the memory device 210. It should be noted that the command queue must be deep enough to let the memory controller 208 issue the pre-charge command and the activation command early enough to compensate the latency cycles.

The memory address mapping circuit 202 may be dedicated to serving one particular image processing application (e.g., a de-interlacing application) only. Thus, the memory address mapping circuit 202 and the image processing circuit 212 are integrated in the same chip 214. However, in an alternative design, the memory address mapping circuit 202 may be implemented to serve a plurality of applications. For example, the memory address mapping circuit 202 may be integrated in the memory controller 208, thus in the same chip 214. This alternative design also obeys the spirit of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A memory address mapping method of controlling storage of a plurality of images in a memory device, the memory device including a plurality of banks each having a plurality of pages, the memory address mapping method comprising:
   receiving a first image;
   referring to an image partition setting to generate a first memory address setting for each horizontal line partition in the first image, wherein the image partition setting defines that one image is divided into a plurality of horizontal line groups each having at least one horizontal line, and each of the horizontal line groups is divided into a plurality of horizontal line partitions in a horizontal line direction;
   receiving a second image; and
   referring to the image partition setting to generate a second memory address setting for each horizontal line partition in the second image;
   wherein a plurality of first memory address settings of the horizontal line partitions in each horizontal line group of the first image control that a corresponding horizontal line group having the horizontal line partitions included therein is not stored into a same bank of the memory device; and wherein a first memory address setting of a first horizontal line partition in the first image and a second memory address setting of a second horizontal line partition in the second image control that the first horizontal line partition and the second horizontal line partition co-located in different images are both stored into a first page.

2. The memory address mapping method of claim 1, wherein the step of generating the first memory address setting for each horizontal line partition in the first image according to the image partition setting comprises:
   generating first memory address settings for adjacent horizontal line partitions of a same horizontal line group in the first image, respectively;
   wherein the first memory address settings of the adjacent horizontal line partitions control that the adjacent horizontal line partitions are respectively stored into different banks of the memory device.

3. The memory address mapping method of claim 1, wherein a first memory address setting of a third horizontal line partition in the first image and a second memory address setting of a fourth horizontal line partition in the second image control that the third horizontal line partition and the fourth horizontal line partition co-located in different images are both stored in a second page; the first horizontal line partition and the third horizontal line partition are adjacent to each other in a same horizontal line group; the second horizontal line partition and the fourth horizontal line partition are adjacent to each other in a same horizontal line group; and the first page and the second page are located in different banks of the memory device.

4. The memory address mapping method of claim 3, wherein a first memory address setting of a fifth horizontal line partition in the first image and a second memory address setting of a sixth horizontal line partition in the second image control that the fifth horizontal line partition and the sixth horizontal line partition co-located in different images are both stored in a third page; the first horizontal line partition and the fifth horizontal line partition are included in different horizontal line groups in the first image and are adjacent to each other in the first image; and the first page and the third page are located in different banks of the memory device.

5. The memory address mapping method of claim 3, further comprising:
   receiving a third image; and
   referring to the image partition setting to generate a third memory address setting for each horizontal line partition in the third image;
   wherein the first memory address setting of the first horizontal line partition in the first image and a third memory address setting of a fifth horizontal line partition in the third image control that the first horizontal line partition and the fifth horizontal line partition co-located in different images are respectively stored into the first page and a third page; and the first page and the third page are located in different banks of the memory device.

6. The memory address mapping method of claim 1, wherein a first memory address setting of a third horizontal line partition in the first image and a second memory address setting of a fourth horizontal line partition in the second image control that the third horizontal line partition and the fourth horizontal line partition co-located in different images are both stored in a second page; the first horizontal line partition and the third horizontal line partition are included in different horizontal line groups in the first image and are adjacent to each other in the first image; and the first page and the second page are located in different banks of the memory device.

7. The memory address mapping method of claim 1, further comprising:
   receiving a third image; and
   referring to the image partition setting to generate a third memory address setting for each horizontal line partition in the third image;
   wherein the first memory address setting of the first horizontal line partition in the first image and a third memory address setting of a third horizontal line partition in the third image control that the first horizontal line partition and the third horizontal line partition co-located in different images are respectively stored into the first page and a second page; and the first page and the second page are located in different banks of the memory device.

8. The memory address mapping method of claim 1, wherein the first memory address setting of each horizontal line partition controls that luminance data and chrominance data of the horizontal line partition are not stored in a same page.

9. A memory address mapping method of controlling storage of a plurality of images in a memory device, the memory device including a plurality of banks each having a plurality of pages, the memory address mapping method comprising:
   receiving a first image; and
   referring to an image partition setting to generate a first memory address setting for each horizontal line partition in the first image, wherein the image partition setting defines that one image is divided into a plurality of horizontal line groups each having at least one horizontal line, and each of the horizontal line groups is divided into a plurality of horizontal line partitions in a horizontal line direction;

deriving a plurality of luminance data parts, including at least a most significant bit (MSB) luminance data part and a least significant bit (LSB) luminance data part, from luminance data of each horizontal line partition; and deriving a plurality of chrominance data parts, including an MSB chrominance data part and an LSB chrominance data part, from chrominance data of each horizontal line partition;

wherein the MSB luminance data part is a collection of MSBs of luminance information of a plurality of pixels in the horizontal line partition; the LSB luminance data part is a collection of LSBs of luminance information of the pixels in the horizontal line partition; the MSB chrominance data part is a collection of MSBs of chrominance information of the pixels in the horizontal line partition; the LSB chrominance data part is a collection of LSBs of chrominance information of the pixels in the horizontal line partition; and the first memory address setting controls that the MSB luminance data part and the LSB luminance data part are not stored in a same page and the MSB chrominance data part and the LSB chrominance data part are not stored in a same page.

10. The memory address mapping method of claim 9, wherein the first memory address setting controls that the MSB luminance data part, the LSB luminance data part, the MSB chrominance data part, the LSB chrominance data part are stored in different banks, respectively.

11. A memory address mapping circuit for controlling storage of a plurality of images in a memory device, the memory device including a plurality of banks each having a plurality of pages, the memory address mapping circuit comprising:

a receiving unit, for receiving a first image and a second image; and an address generating unit, coupled to the receiving unit, for referring to an image partition setting to generate a first memory address setting for each horizontal line partition in the first image, and referring to the image partition setting to generate a second memory address setting for each horizontal line partition in the second image, wherein the image partition setting defines that one image is divided into a plurality of horizontal line groups each having at least one horizontal line, and each of the horizontal line groups is divided into a plurality of horizontal line partitions in a horizontal line direction;

wherein a plurality of first memory address settings of the horizontal line partitions in each horizontal line group of the first image control that a corresponding horizontal line group having the horizontal line partitions included therein is not stored into a same bank of the memory device; and a first memory address setting of a first horizontal line partition in the first image and a second memory address setting of a second horizontal line partition in the second image control that the first horizontal line partition and the second horizontal line partition co-located in different images are both stored into a first page.

12. The memory address mapping circuit of claim 11, wherein the address generating unit generates first memory address settings for adjacent horizontal line partitions of a same horizontal line group in the first image, respectively; and the first memory address settings of the adjacent horizontal line partitions control that the adjacent horizontal line partitions are respectively stored into different banks of the memory device.

13. The memory address mapping circuit of claim 11, wherein a first memory address setting of a third horizontal line partition in the first image and a second memory address setting of a fourth horizontal line partition in the second image control that the third horizontal line partition and the fourth horizontal line partition co-located in different images are both stored in a second page; the first horizontal line partition and the third horizontal line partition are adjacent to each other in a same horizontal line group; the second horizontal line partition and the fourth horizontal line partition are adjacent to each other in a same horizontal line group; and the first page and the second page are located in different banks of the memory device.

14. The memory address mapping circuit of claim 13, wherein a first memory address setting of a fifth horizontal line partition in the first image and a second memory address setting of a sixth horizontal line partition in the second image control that the fifth horizontal line partition and the sixth horizontal line partition co-located in different images are both stored in a third page; the first horizontal line partition and the fifth horizontal line partition are included in different horizontal line groups adjacent to each other in the first image; and the first page and the third page are located in different banks of the memory device.

15. The memory address mapping circuit of claim 13, wherein the receiving unit further receives a third image; the address generating unit further refers to the image partition setting to generate a third memory address setting for each horizontal line partition in the third image; the first memory address setting of the first horizontal line partition in the first image and a third memory address setting of a fifth horizontal line partition in the third image control that the first horizontal line partition and the fifth horizontal line partition co-located in different images are respectively stored into the first page and a third page; and the first page and the third page are located in different banks of the memory device.

16. The memory address mapping circuit of claim 11, wherein a first memory address setting of a third horizontal line partition in the first image and a second memory address setting of a fourth horizontal line partition in the second image control that the third horizontal line partition and the fourth horizontal line partition co-located in different images are both stored in a second page; the first horizontal line partition and the third horizontal line partition are included in different horizontal line groups adjacent to each other in the first image; and the first page and the second page are located in different banks of the memory device.

17. The memory address mapping circuit of claim 11, wherein the receiving unit further receives a third image; the address generating unit further refers to the image partition setting to generate a third memory address setting for each horizontal line partition in the third image; the first memory address setting of the first horizontal line partition in the first image and a third memory address setting of a third horizontal line partition in the third image control that the first horizontal line partition and the third horizontal line partition co-located in different images are respectively stored into the first page and a second page; and the first page and the second page are located in different banks of the memory device.

18. The memory address mapping circuit of claim 11, wherein the first memory address setting of each horizontal line partition controls that luminance data and chrominance data of the horizontal line partition are not stored in a same page.

19. A memory address mapping circuit for controlling storage of a plurality of images in a memory device, the memory device including a plurality of banks each having a plurality of pages, the memory address mapping circuit comprising:
- a receiving unit, for receiving a first image; and
- an address generating unit, coupled to the receiving unit, for referring to an image partition setting to generate a first memory address setting for each horizontal line partition in the first image, wherein the image partition setting defines that one image is divided into a plurality of horizontal line groups each having at least one horizontal line, and each of the horizontal line groups is divided into a plurality of horizontal line partitions in a horizontal line direction;
- wherein the receiving unit further derives a plurality of luminance data parts, including at least a most significant bit (MSB) luminance data part and a least significant bit (LSB) luminance data part, from luminance data of each horizontal line partition, and derives a plurality of chrominance data parts, including an MSB chrominance data part and an LSB chrominance data part, from chrominance data of each horizontal line partition; the MSB luminance data part is a collection of MSBs of luminance information of a plurality of pixels in the horizontal line partition; the LSB luminance data part is a collection of LSBs of luminance information of the pixels in the horizontal line partition; the MSB chrominance data part is a collection of MSBs of chrominance information of the pixels in the horizontal line partition; the LSB chrominance data part is a collection of LSBs of chrominance information of the pixels in the horizontal line partition; and the first memory address setting controls that the MSB luminance data part and the LSB luminance data part are not stored in a same page and the MSB chrominance data part and the LSB chrominance data part are not stored in a same page.

20. The memory address mapping circuit of claim 19, wherein the first memory address setting controls that the MSB luminance data part, the LSB luminance data part, the MSB chrominance data part, the LSB chrominance data part are stored in different banks, respectively.

21. A memory address mapping method of controlling storage of a plurality of images in a memory device, the memory device including a plurality of banks each having a plurality of pages, the memory address mapping method comprising:
- receiving a first image; and
- referring to an image partition setting to generate a first memory address setting for each horizontal line partition in the first image, wherein the image partition setting defines that one image is divided into a plurality of horizontal line groups each having at least one horizontal line, and each of the horizontal line groups is divided into a plurality of horizontal line partitions in a horizontal line direction;
- receiving a second image; and
- referring to the image partition setting to generate a second memory address setting for each horizontal line partition in the second image;
- wherein a first memory address setting of a first horizontal line partition in the first image and a second memory address setting of a second horizontal line partition in the second image control that the first horizontal line partition and the second horizontal line partition co-located in different images are both stored into a same page.

22. A memory address mapping circuit of controlling storage of a plurality of images in a memory device, the memory device including a plurality of banks each having a plurality of pages, the memory address mapping circuit comprising:
- a receiving unit for receiving a first image and a second image; and
- an address generating unit, coupled to the receiving unit, for referring to an image partition setting to generate a first memory address setting for each horizontal line partition in the first image, and referring to the image partition setting to generate a second memory address setting for each horizontal line partition in the second image, wherein the image partition setting defines that one image is divided into a plurality of horizontal line groups each having at least one horizontal line, and each of the horizontal line groups is divided into a plurality of horizontal line partitions in a horizontal line direction;
- wherein a first memory address setting of a first horizontal line partition in the first image and a second memory address setting of a second horizontal line partition in the second image control that the first horizontal line partition and the second horizontal line partition co-located in different images are both stored into a same page.

23. A memory address mapping method of controlling storage of a plurality of images in a memory device, the memory device including a plurality of banks each having a plurality of pages, the memory address mapping method comprising:
- receiving a first image;
- referring to an image partition setting to generate a first memory address setting for each horizontal line partition in the first image, wherein the image partition setting defines that one image is divided into a plurality of horizontal line groups each having at least one horizontal line, and each of the horizontal line groups is divided into a plurality of horizontal line partitions in a horizontal line direction;
- receiving a second image; and
- referring to the image partition setting to generate a second memory address setting for each horizontal line partition in the second image;
- wherein a first memory address setting of a first horizontal line partition and a second memory address setting of a second horizontal line partition control that the first horizontal line partition and the second horizontal line partition co-located in the first image and the second image are stored in a first page and a second page, respectively, and the first page and the second page are located in different banks of the memory device.

24. A memory address mapping circuit of controlling storage of a plurality of images in a memory device, the memory device including a plurality of banks each having a plurality of pages, the memory address mapping circuit comprising:
- a receiving unit for receiving a first image and a second image; and
- an address generating unit, coupled to the receiving unit, for referring to an image partition setting to generate a first memory address setting for each horizontal line partition in the first image, and referring to the image partition setting to generate a second memory address setting for each horizontal line partition in the second image, wherein the image partition setting defines that one image is divided into a plurality of horizontal line groups each having at least one horizontal line, and each of the horizontal line groups is divided into a plurality of horizontal line partitions in a horizontal line direction;

wherein a first memory address setting of a first horizontal line partition and a second memory address setting of a second horizontal line partition control that the first horizontal line partition and the second horizontal line partition co-located in the first image and the second image are stored in a first page and a second page, respectively, and the first page and the second page are located in different banks of the memory device.

* * * * *